(12) United States Patent
Nagasaki et al.

(10) Patent No.: US 10,794,569 B2
(45) Date of Patent: Oct. 6, 2020

(54) WAVELENGTH CONVERSION MEMBER, LIGHT SOURCE AND LIGHTING DEVICE

(71) Applicant: Panasonic Intellectual Property Management Co., Ltd., Osaka (JP)

(72) Inventors: Yoshihisa Nagasaki, Osaka (JP); Takashi Ohbayashi, Osaka (JP); Takahiro Hamada, Osaka (JP); Yukihiko Sugio, Osaka (JP); Yusuke Ogihara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/483,874

(22) PCT Filed: Feb. 9, 2018

(86) PCT No.: PCT/JP2018/004644
§ 371 (c)(1),
(2) Date: Aug. 6, 2019

(87) PCT Pub. No.: WO2018/159268
PCT Pub. Date: Sep. 7, 2018

(65) Prior Publication Data
US 2020/0011507 A1     Jan. 9, 2020

(30) Foreign Application Priority Data

Mar. 2, 2017  (JP) .................................. 2017-039416
Mar. 2, 2017  (JP) .................................. 2017-039424

(51) Int. Cl.
*F21V 9/30* (2018.01)
*F21S 41/176* (2018.01)
(Continued)

(52) U.S. Cl.
CPC ................ *F21V 9/30* (2018.02); *F21S 41/16* (2018.01); *F21S 41/176* (2018.01);
(Continued)

(58) Field of Classification Search
CPC ........... F21S 41/16; F21S 41/176; Y21L 5/30; G02B 5/20; H01S 5/022
See application file for complete search history.

(56) References Cited

U.S. PATENT DOCUMENTS

2007/0278935 A1*  12/2007  Harada .............. C09K 11/0883
                                                    313/503
2014/0022779 A1*   1/2014  Su .............................. F21V 9/30
                                                    362/231

(Continued)

FOREIGN PATENT DOCUMENTS

JP    2008-150518    7/2008
JP    2011-82568     4/2011

(Continued)

OTHER PUBLICATIONS

English Machine Translation of JP 2008150518 provided by Espacenet (Year: 2008).*

(Continued)

*Primary Examiner* — Zheng Song
(74) *Attorney, Agent, or Firm* — Wenderoth, Lind & Ponack, L.L.P.

(57) ABSTRACT

A wavelength conversion member of the present disclosure includes a first matrix, phosphor particles embedded in the first matrix, and at least one selected from the group consisting of first filler particles embedded in the first matrix and surface coating layers respectively covering surfaces of the phosphor particles. The wavelength conversion member satisfies at least one relationship selected from the group consisting of $|n3-n1|>|n1-n2|$ and $|n4-n1|>|n1-n2|$ (Continued)

wherein n1 is a refractive index of the first matrix, n2 is a refractive index of the phosphor particles, n3 is a refractive index of the first filler particles, and n4 is a refractive index of the surface coating layers.

18 Claims, 9 Drawing Sheets

(51) Int. Cl.
- *F21S 41/16* (2018.01)
- *F21Y 115/30* (2016.01)
- *H01S 5/022* (2006.01)
- *G02B 5/20* (2006.01)

(52) U.S. Cl.
CPC ............. *F21Y 2115/30* (2016.08); *G02B 5/20* (2013.01); *H01S 5/022* (2013.01)

(56) References Cited

U.S. PATENT DOCUMENTS

| | | | |
|---|---|---|---|
| 2014/0071683 A1 | 3/2014 | Hamada et al. | |
| 2014/0339585 A1* | 11/2014 | Liao | C09K 11/02 257/98 |
| 2014/0353702 A1* | 12/2014 | Nagao | H01L 33/507 257/98 |
| 2015/0144900 A1* | 5/2015 | Lee | H01L 51/5268 257/40 |
| 2015/0353417 A1* | 12/2015 | Mori | C03C 17/007 359/599 |
| 2017/0023188 A1* | 1/2017 | Mima | H01S 5/005 |
| 2017/0023199 A1 | 1/2017 | Hamada et al. | |
| 2017/0122527 A1* | 5/2017 | Miyanaga | G02B 6/0068 |
| 2017/0198149 A1 | 7/2017 | Yamada et al. | |
| 2018/0019384 A1* | 1/2018 | Abe | H01L 33/54 |

FOREIGN PATENT DOCUMENTS

| | | |
|---|---|---|
| JP | 5614675 | 10/2014 |
| JP | 2014-229901 | 12/2014 |
| JP | 2015-8278 | 1/2015 |
| JP | 2015-122447 | 7/2015 |
| JP | 2016-146460 | 8/2016 |
| JP | 2016-159445 | 9/2016 |
| JP | 2017-28251 | 2/2017 |
| WO | 03/107441 | 12/2003 |
| WO | 2013/172025 | 11/2013 |

OTHER PUBLICATIONS

International Search Report dated May 15, 2018 in International (PCT) Application No. PCT/JP2018/004644.

* cited by examiner

WAVELENGTH CONVERSION MEMBER, LIGHT SOURCE AND LIGHTING DEVICE

TECHNICAL FIELD

The present disclosure relates to a wavelength conversion member, light source, and lighting device.

BACKGROUND ART

Light sources including a light-emitting device and wavelength conversion member are under development in recent years. The wavelength conversion member has phosphor particles embedded in a matrix. Light from the light-emitting device is applied to the phosphor particles as excitation light, and light having a wavelength longer than that of the excitation light is emitted from the phosphor. For this type of light source, attempts have been made to improve brightness of light and optical output.

Patent Literature 1 discloses a wavelength conversion member employing zinc oxide (ZnO) as the material of its matrix. ZnO is an inorganic material having a refractive index closer to those of many phosphors and has excellent light transparency and thermal conductance. Light scattering at an interface between the phosphor particle and ZnO matrix is reduced in the wavelength conversion member of Patent Literature 1, which can thus achieve high optical output.

CITATION LIST

Patent Literature

Patent Literature 1: WO 2013/172025

SUMMARY OF INVENTION

Technical Problem

Although the wavelength conversion member of Patent Literature 1 can achieve high optical output, it is difficult to achieve a high contrast with the use of the wavelength conversion member of Patent Literature 1.

The present disclosure provides a wavelength conversion member having excellent contrast performance.

Solution to Problem

The present disclosure provides a wavelength conversion member, including:

a first matrix;

phosphor particles embedded in the first matrix; and at least one selected from the group consisting of first filler particles embedded in the first matrix and surface coating layers respectively covering surfaces of the phosphor particles, wherein the wavelength conversion member satisfies at least one relationship selected from the group consisting of $|n3-n1|>|n1-n2|$ and $|n4-n1|>|n1-n2|$ wherein n1 is a refractive index of the first matrix, n2 is a refractive index of the phosphor particles, n3 is a refractive index of the first filler particles, and n4 is a refractive index of the surface coating layers.

Advantageous Effects of Invention

According to the techniques of the present disclosure, travel of light inside the wavelength conversion member is suppressed and thus a high contrast can be achieved.

Figure 1:
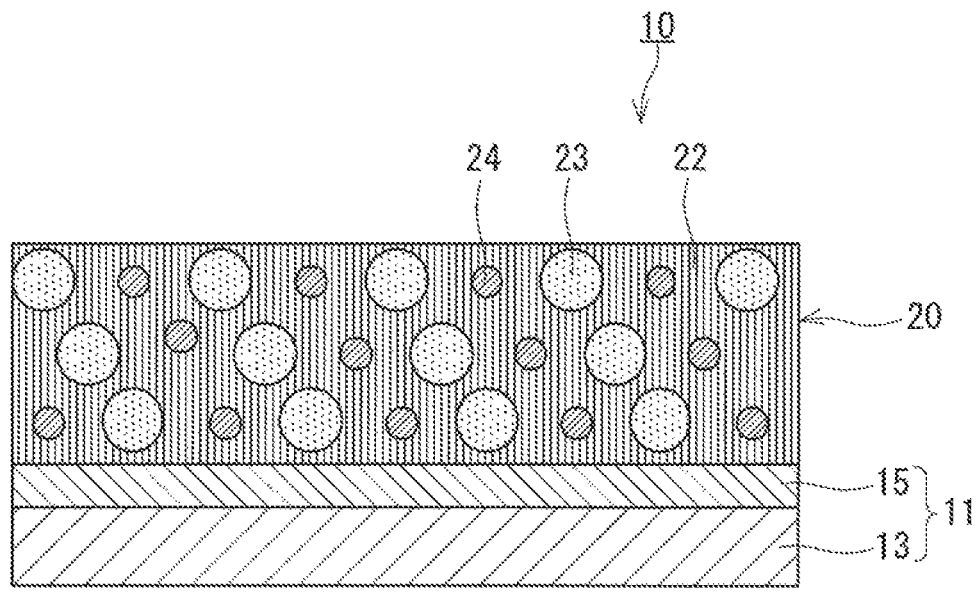
FIG. 1 is a schematic cross-sectional view of a wavelength conversion member according to a first embodiment of the present disclosure.

DESCRIPTION OF EMBODIMENTS (Findings on Which the Present Disclosure is Based)

In a light source including a light-emitting device and wavelength conversion member, the wavelength conversion member may be required to achieve a high contrast. For example, when high-brightness light needs to be applied to a small area, it is desired that sufficiently condensed light be emitted from the wavelength conversion member. A contrast in the wavelength conversion member means a contrast between a portion to which excitation light is applied and a portion to which excitation light is not applied.

In the wavelength conversion member of Patent Literature 1, a phosphor particle has a refractive index close to that of a ZnO matrix. Thus, light is less likely to be scattered inside the wavelength conversion member and light travels to spread inside the wavelength conversion member. As a result, fluorescence occurs in a portion to which excitation light is not applied, and a high contrast cannot be achieved.

(Summary of One Aspect According to the Present Disclosure)

A wavelength conversion member according to a first aspect of the present disclosure is a wavelength conversion member including:

a first matrix;

phosphor particles embedded in the first matrix; and at least one selected from the group consisting of first filler particles embedded in the first matrix and surface coating layers respectively covering surfaces of the phosphor particles, wherein the wavelength conversion member satisfies at least one relationship selected from the group consisting of $|n3-n1|>|n1-n2|$ and $|n4-n1|>|n1-n2|$ wherein n1 is a refractive index of the first matrix, n2 is a refractive index of the phosphor particles, n3 is a refractive index of the first filler particles, and n4 is a refractive index of the surface coating layers.

When the wavelength conversion member satisfies the above relationships, light is likely to be scattered inside the wavelength conversion member and unlikely to travel inside the wavelength conversion member. In such a case, fluorescence is unlikely to occur in a portion to which excitation light is not applied, and thus a high contrast can be achieved. Suppressing travel of light inside the wavelength conversion member makes it possible to produce light without sacrificing brightness and light emission efficiency and achieve a high contrast.

According to a second aspect of the present disclosure, for example, the wavelength conversion member according to the first aspect satisfies $|n3-n1|-|n1-n2|\geq0.3$. When the wavelength conversion member satisfies this relational expression, the scattering probability of light inside the wavelength conversion member increases and a higher contrast can be achieved.

According to a third aspect of the present disclosure, for example, in the wavelength conversion member according to the first or second aspect, an average particle diameter of the first filler particles is smaller than an average particle diameter of the phosphor particles. Because such a configuration ensures a sufficient total surface area of the first filler particles, the scattering probability of light inside the wavelength conversion member increases and a higher contrast can be achieved.

According to a fourth aspect of the present disclosure, for example, in the wavelength conversion member according to any one of the first to third aspects, an average particle diameter of the first filler particles is equal to or greater than a peak wavelength of light fluorescently emitted from the phosphor particles. With such a configuration, light is sufficiently scattered inside the wavelength conversion member and a high contrast can be achieved.

According to a fifth aspect of the present disclosure, for example, in the wavelength conversion member according to any one of the first to fourth aspects, the first filler particles include a metal oxide. Since most metal oxides are chemically stable and emit very little fluorescence, they are suitable as the material of the filler particles.

According to a sixth aspect of the present disclosure, for example, the wavelength conversion member according to any one of the first to fifth aspects satisfies $|n4-n1|-|n1-n2|\geq0.3$. When the wavelength conversion member satisfies this relational expression, the scattering probability of light inside the wavelength conversion member increases and a higher contrast can be achieved.

According to a seventh aspect of the present disclosure, for example, in the wavelength conversion member according to any one of the first to sixth aspects, an average thickness of the surface coating layers is smaller than the average particle diameter of the phosphor particles. According to the seventh aspect, heat of the phosphor particles is sufficiently released to the matrix, and such heat release suppresses an increase in temperature of the phosphor particles and allows optical output to be kept high.

According to an eighth aspect of the present disclosure, for example, in the wavelength conversion member according to any one of the first to seventh aspects, an average thickness of the surface coating layers is equal to or greater than a peak wavelength of light fluorescently emitted from the phosphor particles. With such a configuration, light is sufficiently scattered inside the wavelength conversion member and a high contrast can be achieved.

According to a ninth aspect of the present disclosure, for example, in the wavelength conversion member according to any one of the first to eighth aspects, the first matrix is composed of single-crystalline ZnO or c-axis oriented polycrystalline ZnO. Because of high thermal conductance of ZnO, the use of ZnO as the material of the first matrix allows easy escape of heat of the wavelength conversion member to the outside. This effect can be obtained more sufficiently when the first matrix is composed of single-crystalline ZnO or c-axis oriented polycrystalline ZnO.

Patent Literature 1 discloses a substrate having a reflective layer made of a metal such as aluminum and silver. Only regular reflection occurs on the metal reflective layer, and fluorescence emitted from the phosphor particles cannot be scattered in various directions by the metal reflective layer. Therefore, the metal reflective layer is likely to cause travel of light inside the wavelength conversion member and decreases the contrast performance of the wavelength conversion member.

A tenth aspect of the present disclosure provides, for example, the wavelength conversion member according to any one of the first to ninth aspects further including:

a substrate;

a phosphor layer supported by the substrate; and a light scattering layer disposed between the substrate and the phosphor layer, wherein the phosphor layer includes the first matrix, the phosphor particles, and at least one selected from the group consisting of the first filler particles and the surface coating layers, the light scattering layer includes a second matrix and second filler particles embedded in the second matrix, and a refractive index of the second matrix is different from a refractive index of the second filler particles.

According to the tenth aspect, excitation light and light emitted from the phosphor particles are scattered in the light scattering layer, and thus light is unlikely to travel inside the wavelength conversion member. In such a case, fluorescence is unlikely to occur in a portion to which excitation light is not applied, and thus a high contrast can be achieved. Suppressing travel of light inside the wavelength conversion member makes it possible to produce light without sacrificing brightness and light emission efficiency and achieve a high contrast.

According to an eleventh aspect of the present disclosure, for example, in the wavelength conversion member according to the tenth aspect, a refractive index difference between the second matrix and the second filler particles is 0.3 or more. According to the tenth aspect, the scattering probability of light inside the wavelength conversion member increases and a higher contrast can be achieved.

According to a twelfth aspect of the present disclosure, for example, in the wavelength conversion member according to the tenth or eleventh aspects, thermal conductivity of the second matrix is higher than thermal conductivity of the second filler particles. According to the twelfth aspect, heat of the phosphor layer is promptly conducted to the substrate. Thus, an increase in temperature of the phosphor layer is suppressed and excellent light emission efficiency can be achieved.

According to a thirteenth aspect of the present disclosure, for example, in the wavelength conversion member according to any one of the tenth to twelfth aspects, material composition of the second matrix of the light scattering layer is the same as material composition of the first matrix of the phosphor layer. According to the thirteenth aspect, delamination between the light scattering layer and phosphor layer due to a difference between a linear expansion coefficient of the light scattering layer and that of the phosphor layer can be prevented.

According to a fourteenth aspect of the present disclosure, for example, in the wavelength conversion member according to any one of the tenth to thirteenth aspects, the second filler particles include at least one selected from the group consisting of $SiO_2$ particles and $TiO_2$ particles. These particles are chemically stable and inexpensive.

According to a fifteenth aspect of the present disclosure, for example, the second matrix of the light scattering layer of the wavelength conversion member according to any one of the tenth to fourteenth aspects is composed of single-crystalline ZnO or c-axis oriented polycrystalline ZnO. Because of high thermal conductance of ZnO, the use of ZnO as the material of the second matrix allows easy escape of heat of the wavelength conversion member to the outside. This effect can be obtained more sufficiently when the second matrix is composed of single-crystalline ZnO or c-axis oriented polycrystalline ZnO.

A light source according to a sixteenth aspect of the present disclosure includes:
a light-emitting device; and
the wavelength conversion member according to any one of the first to fifteenth aspects that emits fluorescence in response to excitation light applied from the light-emitting device.

According to the sixteenth aspect, a light source having excellent contrast performance can be provided.

A light source according to a seventeenth aspect of the present disclosure is a light source including:
a light-emitting device; and
the wavelength conversion member according to any one of the tenth to fifteenth aspects that emits fluorescence in response to excitation light applied from the light-emitting device, wherein
the phosphor layer of the wavelength conversion member and the light scattering layer of the wavelength conversion member are located between the light-emitting device and the substrate of the wavelength conversion member.

According to the seventeenth aspect, a light source having excellent contrast performance can be provided.

According to an eighteenth aspect of the present disclosure, for example, in the light source according to the sixteenth or seventeenth aspect, the light-emitting device is a laser diode. Laser diode light has excellent directivity and can be applied only to a certain portion of the wavelength conversion member. This means that a laser diode is suitable to achieve a high contrast.

A lighting device according to a nineteenth aspect of the present disclosure includes:
the light source according to any one of the sixteenth to eighteenth aspects; and
an optical component that leads light emitted from the light source to the outside.

According to the nineteenth aspect, a lighting device having excellent contrast performance can be provided.

From another angle, the present disclosure provides a wavelength conversion member according to a twentieth aspect including:
a substrate;
a phosphor layer supported by the substrate; and
a light scattering layer disposed between the substrate and the phosphor layer, wherein
the light scattering layer includes a matrix and filler particles embedded in the matrix, and
a refractive index of the matrix is different from a refractive index of the filler particles.

According to the twentieth aspect, excitation light and light emitted from the phosphor particles are scattered in the light scattering layer, and thus light is unlikely to travel inside the wavelength conversion member. In such a case, fluorescence is unlikely to occur in a portion to which excitation light is not applied, and thus a high contrast can be achieved. Suppressing travel of light inside the wavelength conversion member makes it possible to produce light without sacrificing brightness and light emission efficiency and achieve a high contrast.

According to a twenty-first aspect of the present disclosure, for example, the wavelength conversion member according to the twentieth aspect, a refractive index difference between the matrix and the filler particles is 0.3 or more. According to the twenty-first aspect, the scattering probability of light inside the wavelength conversion member increases and a higher contrast can be achieved.

According to a twenty-second aspect of the present disclosure, for example, in the wavelength conversion member according to the twenty or twenty-first aspects, thermal conductivity of the matrix is higher than thermal conductivity of the filler particles. According to the twenty-second aspect, heat of the phosphor layer is promptly conducted to the substrate. Thus, an increase in temperature of the phosphor layer is suppressed and excellent light emission efficiency can be achieved.

According to a twenty-third aspect of the present disclosure, for example, in the wavelength conversion member according to any one of the twenty to twenty-second aspects, the phosphor layer includes a matrix and phosphor particles embedded in the matrix, and material composition of the matrix of the light scattering layer is the same as material composition of the matrix of the phosphor layer. According to the twenty-third aspect, delamination between the light scattering layer and phosphor layer due to a difference between a linear expansion coefficient of the light scattering layer and that of the phosphor layer can be prevented.

According to a twenty-fourth aspect of the present disclosure, for example, in the wavelength conversion member according to any one of the twentieth to twenty-third aspects, the filler particles include at least one selected from the group consisting of $SiO_2$ particles and $TiO_2$ particles. These particles are chemically stable and inexpensive.

According to a twenty-fifth aspect of the present disclosure, for example, in the wavelength conversion member according to the twenty to twenty-fourth aspects, the matrix of the light scattering layer is composed of single-crystalline ZnO or c-axis oriented polycrystalline ZnO. Because of high thermal conductance of ZnO, the use of ZnO as the material of the matrix allows easy escape of heat of the wavelength conversion member to the outside. This effect can be obtained more sufficiently when the matrix is composed of single-crystalline ZnO or c-axis oriented polycrystalline ZnO.

A reflection light source according to a twenty-sixth aspect of the present disclosure is a reflection light source including:

a light-emitting device; and the wavelength conversion member according to any one of the twenty to twenty-fifth aspects that emits fluorescence in response to excitation light applied from the light-emitting device, wherein the phosphor layer of the wavelength conversion member and the light scattering layer of the wavelength conversion member are located between the light-emitting device and the substrate of the wavelength conversion member.

According to the twenty-sixth aspect, a light source having excellent contrast performance can be provided.

According to a twenty-seventh aspect of the present disclosure, for example, in the reflection light source according to the twenty-sixth aspect of the present disclosure, the light-emitting device is a laser diode. Laser diode light has excellent directivity and can be applied only to a certain portion of the wavelength conversion member. This means that a laser diode is suitable to achieve a high contrast.

A lighting device according to a twenty-eighth aspect the present disclosure includes:

the reflection light source according to the twenty-sixth or twenty-seventh aspect; and an optical component that leads light emitted from the light source to the outside.

According to the twenty-eighth aspect, a lighting device having excellent contrast performance can be provided.

Hereinafter, embodiments of the present invention will be described with reference to the drawings. The present disclosure is not limited to the embodiments presented below.

First Embodiment

As shown in FIG. 1, a wavelength conversion member 10 of the present embodiment includes a substrate 11 and phosphor layer 20. The substrate 11 supports the phosphor layer 20. The phosphor layer 20 is disposed on the substrate 11. The phosphor layer 20 has a matrix 22 (first matrix), phosphor particles 23, and filler particles 24 (first filler particles). The matrix 22 is located between the particles. The particles are embedded in the matrix 22. In other words, the particles are dispersed in the matrix 22.

When excitation light having a first wavelength band is applied to the wavelength conversion member 10, the wavelength conversion member 10 converts a portion of the excitation light into light having a second wavelength band and emits the light having the second wavelength band. The wavelength conversion member 10 emits light having a wavelength longer than that of the excitation light. The second wavelength band is different from the first wavelength band. However, the second wavelength band may partially overlap with the first wavelength band. The light emitted from the wavelength conversion member 10 may include not only the light emitted from the phosphor particles 23 but also the excitation light itself.

The substrate 11 has a substrate body 13 and film 15. The thickness of the substrate 11 is, for example, greater than that of the phosphor layer 20. The substrate body 13 is made of one material selected from the group consisting of sapphire ($Al_2O_3$), gallium nitride (GaN), aluminum nitride (AlN), silicon, aluminum, glass, quartz ($SiO_2$), silicon carbide (SiC), and zinc oxide. The substrate body 13 is transmissive to, for example, excitation light and light emitted from the phosphor particles 23. In this case, the wavelength conversion member 10 can be preferably used in a transmission light source. In the case where the substrate 11 is not light-transmissive, the wavelength conversion member 10 can be used in a reflection light source. The substrate body 13 may have a mirror-polished surface.

The film 15 functions as an underlayer on which the phosphor layer 20 is formed. When the matrix 22 of the phosphor layer 20 is crystalline, the film 15 functions as a seed crystal in a crystal growth process of the matrix 22. That is, the film 15 is a single-crystalline film or polycrystalline film. When the matrix 22 is composed of single-crystalline ZnO or polycrystalline ZnO, the film 15 can be a single-crystalline ZnO film or polycrystalline ZnO film. However, when the substrate body 13 can function as a seed crystal, the film 15 may be omitted. For example, when the substrate body 13 is composed of crystalline GaN or crystalline ZnO, the matrix 22 composed of crystalline ZnO can be formed directly on the substrate body 13. The film 15 can be omitted also when the matrix 22 is not crystalline.

Figure 3:
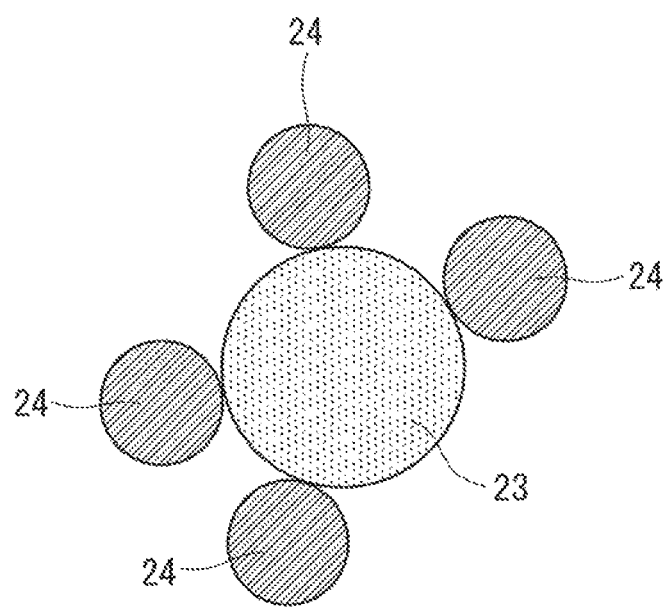
FIG. 3 shows an example of the positional relationship between a phosphor particle and filler particles.

In the phosphor layer 20, the phosphor particles 23 are dispersed in the matrix 22. In FIG. 1, the phosphor particles 23 are apart from each other. The filler particles 24 are also apart from the phosphor particles 23. The phosphor particles 23 may have contact with each other. The filler particles 24 may have contact with the phosphor particles 23. As shown in FIG. 3, a plurality of filler particles 24 may have contact with the phosphor particle 23. The phosphor particles 23 and filler particles 24 may be stacked like a stone wall.

The material of the phosphor particles 23 is not particularly limited. Various fluorescent substances can be used as the material of the phosphor particles 23. Specifically, fluorescent substances such as $Y_3Al_5O_{12}$:Ce (YAG), $Y_3(Al,Ga)_5O_{12}$:Ce (GYAG), $Lu_3Al_5O_{12}$:Ce (LuAG), $(Si,Al)_6(O,N)_8$:Eu (β-SiAlON), $(La,Y)_3Si_6N_{11}$:Ce (LYSN), and $Lu_2CaMg_2Si_3O_{12}$:Ce (LCMS) can be used. The phosphor particles 23 may include a plurality of types of phosphor particles having different compositions. The wavelength of excitation light to be applied to the phosphor particles 23 and the wavelength of light (fluorescently emitted light) to be emitted from the phosphor particles 23 are selected depending on the intended use of the wavelength conversion member 10.

The average particle diameter of the phosphor particles 23 is, for example, in the range of 0.1 to 50 μm. The average particle diameter of the phosphor particles 23 can be determined, for example, by the following method. First, a cross-section of the wavelength conversion member 10 is observed with a scanning electron microscope. The electron microscope image obtained is used to calculate the area of a certain phosphor particle 23 by image processing. The diameter of a circle having the same area as the calculated area is defined as the particle diameter (the diameter of the particle) of the certain phosphor particle 23. The particle diameters of any number (e.g., 50) of phosphor particles 23 are separately calculated, and the average of the resultant values is defined as the average particle diameter of the phosphor particles 23. In the present disclosure, the phosphor particles 23 are not limited in shape. The phosphor particles 23 may be spherical, flaky, or fibrous in shape. In the present disclosure, the method for measuring the average particle diameter is not limited to the above method.

The matrix 22 is composed of, for example, a resin, glass, or another inorganic material. Examples of the resin include a silicone resin. Examples of the other inorganic material include $Al_2O_3$, ZnO, and $SiO_2$. The other inorganic material may be crystalline. The matrix 22 is desirably transmissive to, for example, excitation light and light emitted from the phosphor particles 23. The matrix 22 may have a refractive index higher than that of the phosphor particles 23, or may have a refractive index lower than that of the phosphor particles 23. ZnO is a material suitable as the matrix 22 in terms of the transparency and thermal conductance. Because of high thermal conductance of ZnO, the use of ZnO as the material of the first matrix 22 allows easy escape of heat of the phosphor layer 20 to the outside (chiefly, the substrate 11).

ZnO serving as the material of the matrix 22 is specifically single-crystalline ZnO or c-axis oriented polycrystalline ZnO. ZnO has a wurtzite crystal structure. The term "c-axis oriented ZnO" refers to ZnO having the c plane parallel to a principal surface (surface having the largest area) of the substrate 11.

The c-axis oriented polycrystalline ZnO includes a plurality of c-axis oriented columnar crystal grains. There are a few grain boundaries in the c-axis direction in the c-axis oriented polycrystalline ZnO. The columnar crystal grain is oriented along the c-axis, which means that ZnO grows faster in the c-axis direction than in the a-axis direction and that a tall ZnO crystal grain is formed on the substrate 11. The c-axis of the ZnO crystal grain is parallel to the normal direction of the substrate 11. Alternatively, the inclination of the c-axis of the ZnO crystal grain with respect to the normal direction of the substrate 11 is 4° or less. Here, the description "the inclination of the c-axis is 4° or less" means that a distribution of the inclination of the c-axis is 4° or less. The description "the inclination of the c-axis is 4° or less" does not necessarily mean that the inclination of the c-axis of every crystal grain is 4° or less. The "inclination of the c-axis" can be evaluated by means of the half width obtained by X-ray rocking curve measurement for the c-axis. Specifically, the half width obtained by X-ray rocking curve measurement for the c-axis is 4° or less. Patent Literature 1 (WO 2013/172025) discloses a matrix composed of c-axis oriented polycrystalline ZnO in detail.

In the phosphor layer 20, the filler particles 24 are dispersed in the matrix 22. The filler particles 24 are, for example, inorganic particles and typically include a metal oxide. The filler particles 24 may consist essentially of a metal oxide. Since most metal oxides are chemically stable and emit very little fluorescence, they are suitable as the material of the filler particles 24. The term "consist essentially of" means excluding other components which change the essential characteristics of the referred compound.

When excitation light is applied to the filler particles 24, the filler particles 24 do not fluorescently emit light or only fluorescently emit light having a negligible degree of intensity. In an example, the filler particles 24 include at least one selected from $SiO_2$ particles and $TiO_2$ particles. These particles satisfy the above requirement and are chemically stable and inexpensive. The filler particles 24 also are not limited in shape. The filler particles 24 may be spherical, flaky, or fibrous in shape.

In the present embodiment, the wavelength conversion member 10 satisfies the following expression (1) wherein n1 is a refractive index of the matrix 22, n2 is a refractive index of the phosphor particles 23, and n3 is a refractive index of the filler particles 24. That is, a refractive index difference between the filler particles 24 and matrix 22 is larger than a refractive index difference between the matrix 22 and phosphor particles 23.

$$|n3-n1|>|n1-n2| \qquad (1)$$

When the wavelength conversion member 10 satisfies the above relationship, light is likely to be scattered inside the wavelength conversion member 10 and unlikely to travel inside the wavelength conversion member 10. In such a case, fluorescence is unlikely to occur in a portion to which excitation light is not applied, and thus a high contrast can be achieved. Suppressing travel of light inside the wavelength conversion member 10 makes it possible to produce light without sacrificing brightness and light emission efficiency and achieve a high contrast.

The relationship of the expression (1) is satisfied, for example, by the following combinations of the materials.

Matrix 22: ZnO (n=1.95)
Phosphor particles 23: YAG (n=1.82)
Filler particles 24: $SiO_2$ (n=1.45)
Matrix 22: ZnO (n=1.95)
Phosphor particles 23: YAG (n=1.82)
Filler particles 24: $TiO_2$ (n=2.72)
Matrix 22: silicone resin (n=1.40)
Phosphor particles 23: YAG (n=1.82)
Filler particles 24: $TiO_2$ (n=2.72)

Moreover, the wavelength conversion member 10 desirably satisfies the following expression (2). That is, the refractive index difference between the filler particles 24 and matrix 22 is larger than the refractive index difference between the matrix 22 and phosphor particles 23 by 0.3 or more. When the wavelength conversion member 10 satisfies the expression (2), the scattering probability of light inside the wavelength conversion member 10 increases and a higher contrast can be achieved. The upper limit of the left-hand side of the expression (2) is, for example, but not particularly limited to, 2.0.

$$|n3-n1|-|n1-n2| \geq 0.3 \qquad (2)$$

The refractive index can be measured using the D line (589.3 nm) of sodium by the critical angle method. In the present disclosure, a measured refractive index value of a specimen produced using the same material as that of the matrix 22 can be used as the refractive index n1 of the matrix 22. Similarly, a measured refractive index value of a specimen produced using the same material as that of the phosphor particles 23 can be used as the refractive index n2 of the phosphor particles 23. A measured refractive index value of a specimen produced using the same material as that of the filler particles 24 can be used as the refractive index n3 of the filler particles 24. The refractive index generally decreases with an increase in temperature. However, the amount of the refractive index decrease due to the temperature increase is small. Thus, as long as the expression (1) or (2) is satisfied at room temperature (20° C.), the desired effect can be obtained sufficiently also at a temperature reached in actual use of the wavelength conversion member 10.

The average particle diameter of the filler particles 24 is, for example, in the range of 0.1 to 20 μm. The average particle diameter of the filler particles 24 is desirably smaller than that of the phosphor particles 23. Because such a configuration ensures a sufficient total surface area of the filler particles 24, the scattering probability of light inside the wavelength conversion member 10 increases and a higher contrast can be achieved. The ratio (D2/D1) of the average particle diameter D2 of the filler particles 24 to the average particle diameter D1 of the phosphor particles 23 is, for example, in the range of 0.01 to 0.90. The average particle diameter of the filler particles 24 can be measured by the same method as for the average particle diameter of the phosphor particles 23.

Moreover, the average particle diameter of the filler particles 24 is desirably equal to or greater than a peak wavelength of light fluorescently emitted from the phosphor particles 23. With such a configuration, light is sufficiently scattered inside the wavelength conversion member 10 and a high contrast can be achieved. For example, when the phosphor particles 23 are made of YAG, the fluorescence peak wavelength is in the range of 540 to 580 nm. When the phosphor particles 23 are made of β-SiAlON, the fluorescence peak wavelength is in the range of 520 to 550 nm.

When the volume of the phosphor particles 23 is V1 and the volume of the filler particles 24 is V2, V2/(V1+V2) is, for example, in the range of 0.1 to 0.9. The value of V2/(V1+V2) can be adjusted appropriately depending on the particle diameters of the filler particles 24, particles of the phosphor particles 23, and required color of emitted light (ratio of fluorescence to excitation light and scattered light).

The filler particles 24 are desirably excellent in thermal conductance. From this perspective, $SiO_2$ particles as the filler particles 24 have room for improvement. $Al_2O_3$ particles whose surfaces are each covered with a $SiO_2$ coating, for example, satisfy both thermal conductance and refractive index requirements. As the refractive index of $Al_2O_3$ is 1.77, it is difficult to use $Al_2O_3$ particles in the wavelength conversion member of the present disclosure. The $Al_2O_3$ particles whose surfaces are each covered with the $SiO_2$ coating have an apparent refractive index (n=1.45) of $SiO_2$ and therefore can be preferably used in the wavelength conversion member of the present disclosure. The entire surface of each $Al_2O_3$ particle may be covered with the $SiO_2$ coating, or only a portion of the surface of each $Al_2O_3$ particle may be covered with the $SiO_2$ coating. Such filler particles 24 can be produced, for example, by a sol-gel process. Specifically, a sol mixture containing the $Al_2O_3$ particles and a precursor such as a silicon alkoxide is prepared. After filtration of the sol mixture, the residue is dried and heated to obtain the $Al_2O_3$ particles covered with the $SiO_2$ coating.

Next, the method for producing the wavelength conversion member 10 will be described.

When the matrix 22 is composed of a resin, the phosphor particles 23 and filler particles 24 are mixed in a solution containing a resin and solvent to prepare a coating liquid. The coating liquid is applied to the substrate 11 so as to form a coating film on the substrate 11. The coating film is dried or cured to obtain the wavelength conversion member 10.

When the matrix 22 is composed of ZnO, the matrix 22 can be formed, for example, by a sol-gel process. First, a sol mixture containing a precursor such as a zinc alkoxide, the phosphor particles 23, and filler particles 24 is prepared. The sol mixture is applied to the substrate 11 so as to form a coating film on the substrate 11. The coating film is turned into a gel and heated to obtain the wavelength conversion member 10.

When the matrix 22 is single-crystalline ZnO or c-axis oriented polycrystalline ZnO, the matrix 22 can be formed on the substrate 11 by a solution-growth method.

First, the substrate 11 is prepared. A crystalline ZnO film is formed as the film 15 on the substrate body 13. A vacuum film formation method such as electron beam vapor deposition, reactive plasma deposition, sputtering, and pulsed laser deposition is used as the method for forming the ZnO film. The film 15 can be a single-crystalline ZnO film or polycrystalline ZnO film. Next, a layer including the phosphor particles 23 and filler particles 24 is formed on the substrate 11 (namely, on the film 15). For example, a dispersion containing the phosphor particles 23 and filler particles 24 is prepared. The substrate 11 is placed in the dispersion, and the phosphor particles 23 and filler particles 24 are deposited on the substrate 11 by means of an electrophoresis method. The layer including the phosphor particles 23 and filler particles 24 can thus be formed on the substrate 11. The layer including the phosphor particles 23 and filler particles 24 can also be formed on the substrate 11 by placing the substrate 11 in the dispersion and causing sedimentation of the phosphor particles 23 and filler particles 24. The layer including the phosphor particles 23 and filler particles 24 can also be formed on the substrate 11 using a coating liquid containing the phosphor particles 23 and filler particles 24 by a film formation method such as printing.

Next, the matrix 22 is formed between the particles by the solution-growth method using a Zn-containing solution. The wavelength conversion member 10 can thus be obtained. The solution-growth method used is chemical bath deposition carried out under atmospheric pressure, hydrothermal synthesis carried out under atmospheric pressure or a pressure higher than atmospheric pressure, electrochemical deposition in which voltage or current is applied, or the like. For example, an aqueous zinc nitrate solution containing hexamethylenetetramine is used as the solution for crystal growth. The crystalline matrix 22 is epitaxially grown on the film 15.

(Modification 1)

Figure 2:
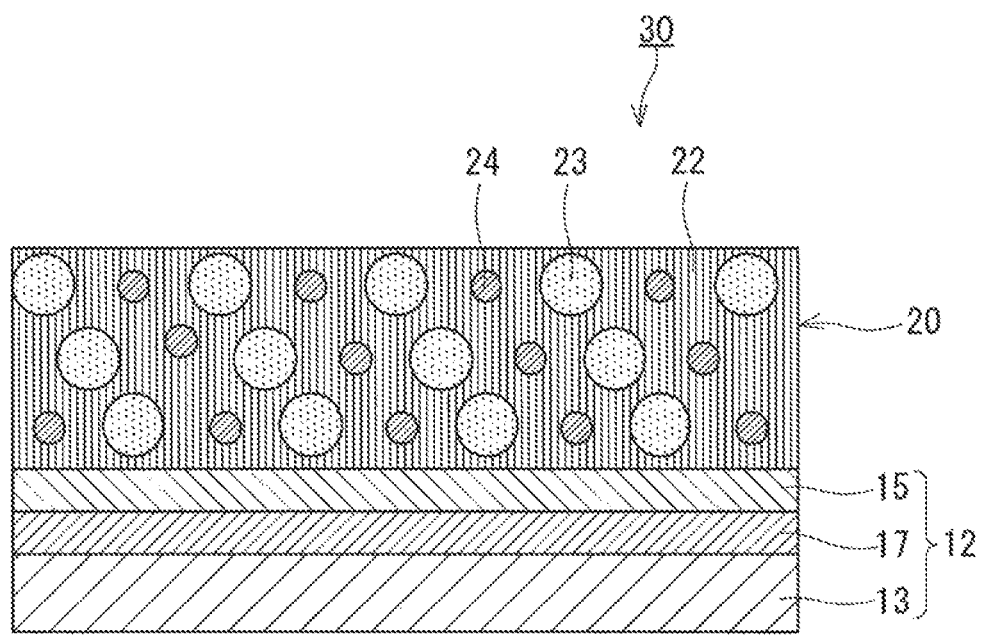
FIG. 2 is a schematic cross-sectional view of a wavelength conversion member according to a modification 1.

A wavelength conversion member 30 of a modification 1 shown in FIG. 2 includes a substrate 12 instead of the substrate 11. The substrate 12 has the substrate body 13, film 15 (first film), and a film 17 (second film). The second film 17 is disposed between the substrate body 13 and first film 15. The first film 15 is, for example, the film 15 previously described. Examples of the second film 17 include an antireflection film, dichroic mirror, metal reflective film, highly reflective film, and protective film. The antireflection film is a film for preventing reflection of excitation light. The dichroic mirror can be composed of a dielectric multilayer film. The metal reflective film is a film for reflecting light and made of a metallic material such as silver and aluminum. The highly reflective film can be composed of a dielectric multilayer film. The protective film can be a film for physically or chemically protecting these films.

The second film 17 may be provided on the back side of the substrate body 13. The second film 17 may be provided on both the front and back sides of the substrate body 13. The first film 15 may be omitted and only the second film 17 may be provided.

Other embodiments will be described hereinafter. The elements common between the wavelength conversion member 10 (or 30) of the first embodiment and wavelength conversion members of other embodiments are denoted by the same reference characters, and the description of such elements may be omitted. That is, the description of each embodiment is applicable to the other embodiments unless technical inconsistency occurs. Furthermore, the embodiments may be combined with each other unless technical inconsistency occurs.

Second Embodiment

Figure 4:
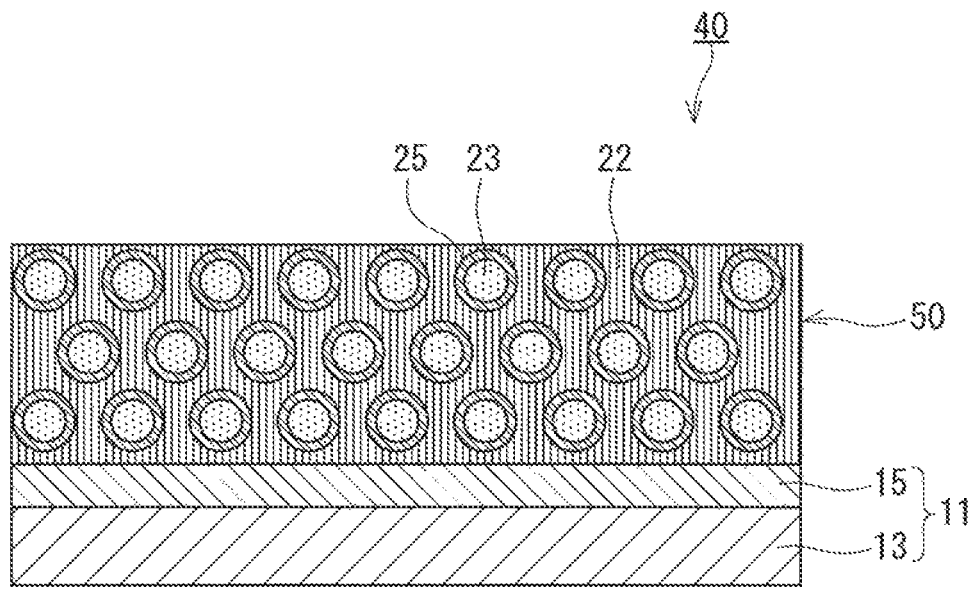
FIG. 4 is a schematic cross-sectional view of a wavelength conversion member according to a second embodiment of the present disclosure.

As shown in FIG. 4, a wavelength conversion member 40 according to the present embodiment includes the substrate 11 and a phosphor layer 50.

The phosphor layer 50 has the matrix 22 and phosphor particles 23. The surfaces of the phosphor particles 23 are respectively covered by surface coating layers 25.

The surface coating layer 25 is composed of, for example, an inorganic material. The surface coating layer 25 may cover the entire surface of each phosphor particle 23, or may cover only a portion of the surface of each phosphor particle 23. When excitation light is applied to the surface coating layer 25, the surface coating layer 25 dose not fluorescently emit light or only fluorescently emits light having a negligible degree of intensity. In an example, the surface coating layer 25 is composed of at least one material selected from $SiO_2$ and $TiO_2$. The material composition of the surface coating layer 25 may be the same as or different from the material composition of the filler particles 24 described in the first embodiment.

In the present embodiment, the wavelength conversion member 40 satisfies the following expression (3) wherein n1 is the refractive index of the matrix 22, n2 is the refractive index of the phosphor particles 23, and n4 is a refractive index of the surface coating layers 25. That is, a refractive index difference between the surface coating layer 25 and matrix 22 is larger than the refractive index difference between the matrix 22 and phosphor particles 23.

$$|n4-n1|>|n1-n2| \quad (3)$$

When the wavelength conversion member 40 satisfies the above relationship, light is likely to be scattered inside the wavelength conversion member 40 and unlikely to travel inside the wavelength conversion member 40. In such a case, fluorescence is unlikely to occur in a portion to which excitation light is not applied, and thus a high contrast can be achieved. Suppressing travel of light inside the wavelength conversion member 40 makes it possible to produce light without sacrificing brightness and light emission efficiency and achieve a high contrast.

Material combinations satisfying the relationship of the expression (3) can be obtained from the combinations in the first embodiment by replacing the "filler particles 24" with the "surface coating layers 25."

Furthermore, the wavelength conversion member 40 desirably satisfies the following expression (4). That is, the refractive index difference between the surface coating layer 25 and matrix 22 is larger than the refractive index difference between the matrix 22 and phosphor particles 23 by 0.3 or more. When the wavelength conversion member 40 satisfies the expression (4), the scattering probability of light inside the wavelength conversion member 40 increases and a higher contrast can be achieved. The upper limit of the left-hand side of the expression (4) is, for example, but not particularly limited to, 2.0.

$$|n4-n1|-|n1-n2|\geq 0.3 \quad (4)$$

The average thickness of the surface coating layers 25 is desirably smaller than the average particle diameter of the phosphor particles 23. In such a case, heat of the phosphor particles 23 is sufficiently released to the matrix 22, and such heat release suppresses an increase in temperature of the phosphor particles 23 and allows optical output to be kept high. The ratio (T/D) of the average thickness T of the surface coating layers 25 to the average particle diameter D of the phosphor particles 23 is, for example, in the range of 0.01 to 1.00.

Figure 6:
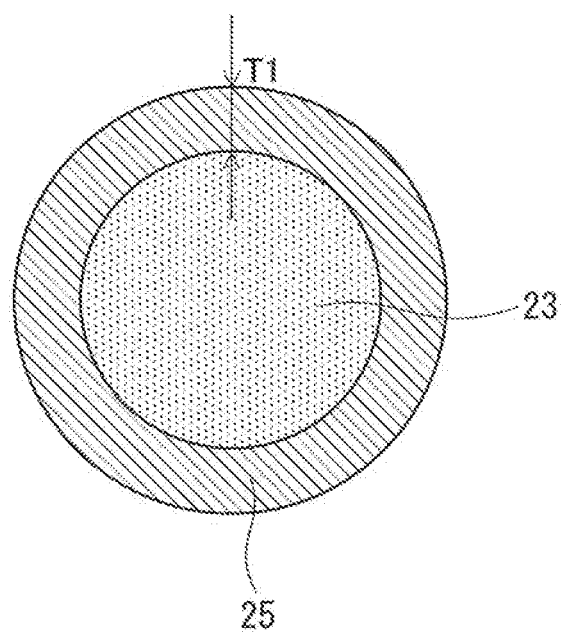
FIG. 6 is an enlarged cross-sectional view of a phosphor particle and surface coating layer.

As shown in FIG. 6, the thickness T1 of the surface coating layer 25 refers to the thickness from the surface of the phosphor particle 23 to the surface of the surface coating layer 25.

The average thickness of the surface coating layers 25 is, for example, in the range of 0.20 to 5.00 µm. The average thickness of the surface coating layers 25 can be determined, for example, using an electron microscope image and EDX measurement of cross-sections of the particles. For example, using an EDX image of a certain particle, the thickness of the surface coating layer 25 is measured at any number of points (e.g., 5 points). The average of the resultant values can be defined as the thickness of the surface coating layer 25 of the certain particle. Then, the same measurement is carried out for a plurality of particles (e.g., 10 particles including the certain particle above). The average thickness of the surface coating layers 25 can be determined by dividing the sum of the resultant thicknesses by the number of particles (10 particles). Exposure of cross-sections of the particles is achieved by a method such as FIB (focused ion beam).

The average thickness of the surface coating layers 25 is desirably equal to or greater than the peak wavelength of light fluorescently emitted from the phosphor particles 23. With such a configuration, light is sufficiently scattered inside the wavelength conversion member 40 and a high contrast can be achieved.

(Modification 2)

Figure 5:
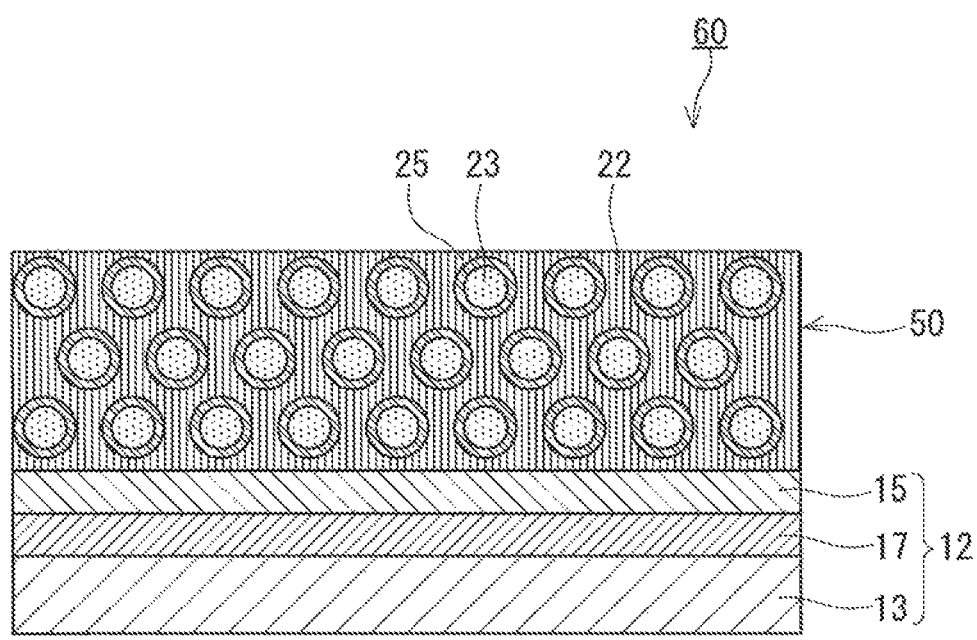
FIG. 5 is a schematic cross-sectional view of a wavelength conversion member according to a modification 2.

A wavelength conversion member 60 of a modification 2 shown in FIG. 5 includes the substrate 12 instead of the substrate 11. A configuration of the substrate 12 is as described with reference to FIG. 2.

Third Embodiment

Figure 7:
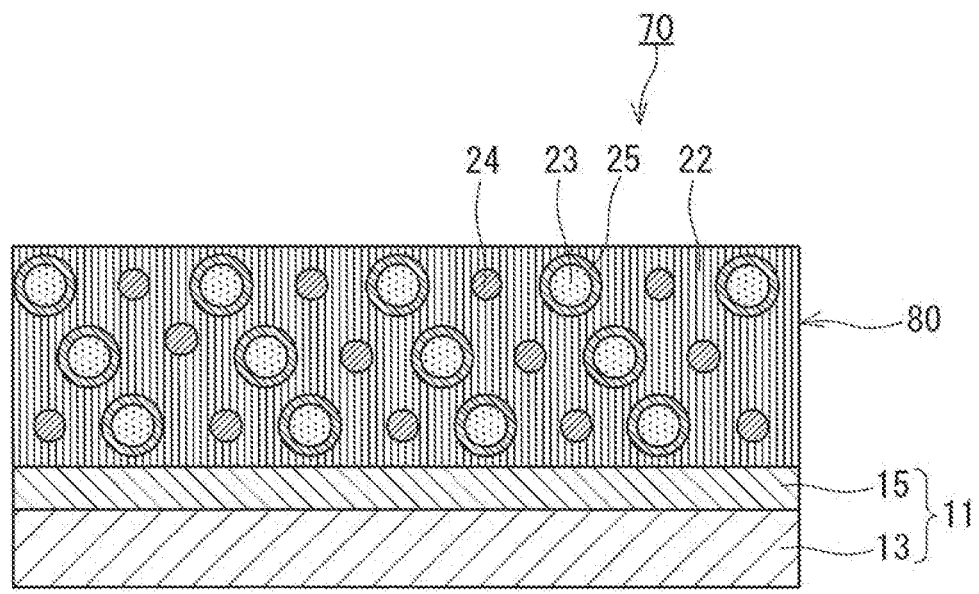
FIG. 7 is a schematic cross-sectional view of a wavelength conversion member according to a third embodiment of the present disclosure.

As shown in FIG. 7, a wavelength conversion member 70 according to the present embodiment includes the substrate 11 and a phosphor layer 80. The phosphor layer 80 has the matrix 22, phosphor particles 23, and filler particles 24. The surfaces of the phosphor particles 23 are respectively covered by the surface coating layers 25. The present embodiment is a combination of the first embodiment and second embodiment. According to the present embodiment, the advantageous effects of both the first and second embodiments can be obtained. The substrate 11 may be replaced with the substrate 12 described with reference to FIG. 2.

Fourth Embodiment

Figure 8:
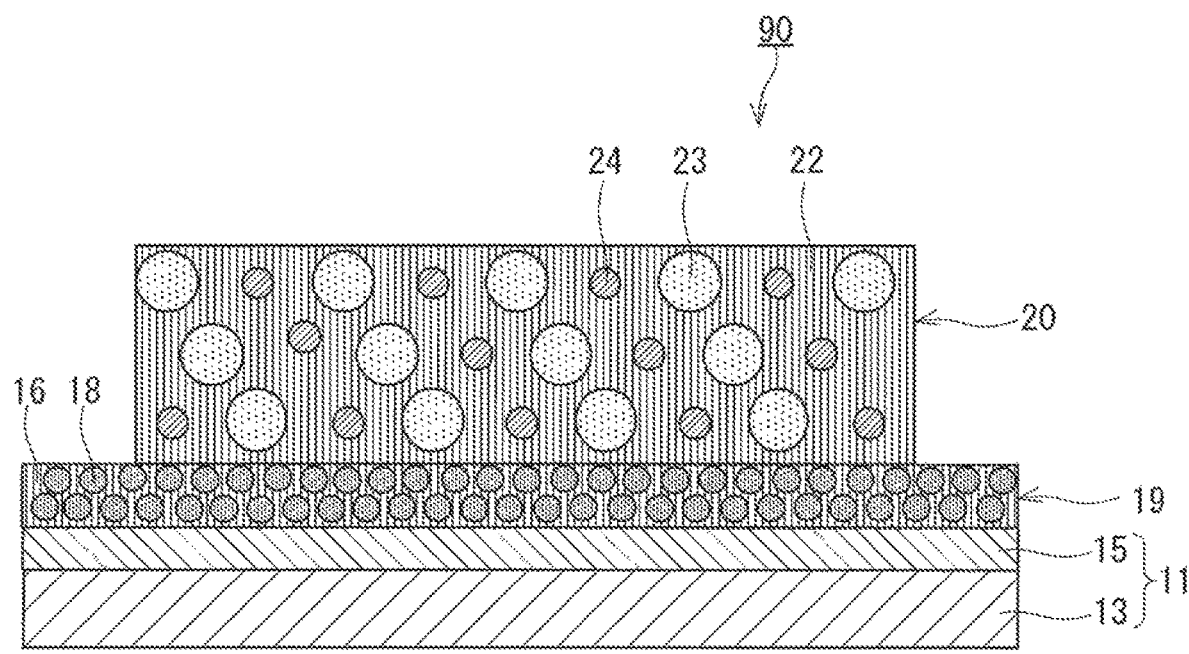
FIG. 8 is a schematic cross-sectional view of a wavelength conversion member according to a fourth embodiment of the present disclosure.

As shown in FIG. 8, a wavelength conversion member 90 of the present embodiment includes the substrate 11, a light scattering layer 19, and the phosphor layer 20. The substrate 11 supports the light scattering layer 19 and phosphor layer 20. The light scattering layer 19 is disposed between the substrate 11 and phosphor layer 20. The light scattering layer 19 has contact with both the substrate 11 and phosphor layer 20. The light scattering layer 19 has a matrix 16 (second matrix) and filler particles 18 (second filler particles). The matrix 16 is located between the particles. The filler particles 18 are embedded in the matrix 16. In other words, the filler particles 18 are dispersed in the matrix 16. The phosphor layer 20 has the matrix 22 (first matrix), phosphor particles 23, and filler particles 24 (first filler particles). The matrix 22 is located between the particles. The phosphor particles 23 are embedded in the matrix 22. In other words, the phosphor particles 23 are dispersed in the matrix 22.

A configuration of the substrate 11 is as described in the first embodiment. The substrate 11 may be replaced with the substrate 12 described with reference to FIG. 2.

The film 15 functions as an underlayer on which the light scattering layer 19 is formed. When the matrix 16 of the light scattering layer 19 is crystalline, the film 15 functions as a seed crystal in a crystal growth process of the matrix 16. That is, the film 15 is a single-crystalline film or polycrystalline film. When the matrix 16 is composed of single-crystalline ZnO or polycrystalline ZnO, the film 15 can be a single-crystalline ZnO film or polycrystalline ZnO film. However, when the substrate body 13 can function as a seed crystal, the film 15 may be omitted. For example, when the substrate body 13 is composed of crystalline GaN or crystalline ZnO, the matrix 16 composed of crystalline ZnO can be formed directly on the substrate body 13. The film 15 can be omitted also when the matrix 16 is not crystalline.

In the light scattering layer 19, the filler particles 18 are dispersed in the matrix 16. In FIG. 8, the filler particles 18 are apart from each other. The filler particles 18 may have contact with each other. For example, the filler particles 18 may be stacked like a stone wall.

The filler particles 18 are, for example, inorganic particles and typically made of a metal oxide. The filler particles 18 may consist essentially of a metal oxide. Since most metal oxides are chemically stable and emit very little fluorescence, they are suitable as the material of the filler particles 18.

When excitation light is applied to the filler particles 18, the filler particles 18 do not fluorescently emit light or only fluorescently emit light having a negligible degree of intensity. In an example, the filler particles 18 include at least one selected from $SiO_2$ particles and $TiO_2$ particles. These particles satisfy the above requirement and are chemically stable and inexpensive. The filler particles 18 also are not limited in shape. The filler particles 18 may be spherical, flaky, or fibrous in shape.

The matrix 16 is composed of, for example, a resin, glass, or another inorganic material. Examples of the resin include a silicone resin. Examples of the other inorganic material include $Al_2O_3$, ZnO, and $SiO_2$. The other inorganic material may be crystalline. ZnO is a material suitable as the matrix 16. Because of high thermal conductance of ZnO, the use of ZnO as the material of the matrix 16 allows easy escape of heat of the phosphor layer 20 to the outside (chiefly, the substrate 11).

ZnO serving as the material of the matrix 16 is specifically single-crystalline ZnO or c-axis oriented polycrystalline ZnO. ZnO has a wurtzite crystal structure. The term "c-axis oriented ZnO" refers to ZnO having the c plane parallel to a principal surface (surface having the largest area) of the substrate 11.

The c-axis oriented polycrystalline ZnO includes a plurality of c-axis oriented columnar crystal grains. There are a few grain boundaries in the c-axis direction in the c-axis oriented polycrystalline ZnO. The columnar crystal grain is oriented along the c-axis, which means that ZnO grows faster in the c-axis direction than in the a-axis direction and that a tall ZnO crystal grain is formed on the substrate 11. The c-axis of the ZnO crystal grain is parallel to the normal direction of the substrate 11.

Alternatively, the inclination of the c-axis of the ZnO crystal grain with respect to the normal direction of the substrate 11 is 4° or less.

A configuration of the phosphor layer 20 is as described in the first embodiment.

Filler particles same as the filler particles 18 of the light scattering layer 19 can be used as the filler particles 24 of the phosphor layer 20. As a matter of course, the material composition of the filler particles 24 of the phosphor layer 20 may be different from the material composition of the filler particles 18 of the light scattering layer 19. The average particle diameter of the filler particles 24 of the phosphor layer 20 may be different from that of the filler particles 18 of the light scattering layer 19.

In the present embodiment, the material composition of the matrix 22 of the phosphor layer 20 is the same as the material composition of the matrix 16 of the light scattering layer 19. With such a configuration, delamination between the light scattering layer 19 and phosphor layer 20 due to a difference between a linear expansion coefficient of the light scattering layer 19 and that of the phosphor layer 20 can be prevented. Additionally, since the thermal resistance between the light scattering layer 19 and phosphor layer 20 is extremely small, heat generated in the phosphor layer 20 is allowed to escape efficiently to the substrate 11.

For example, both the matrices 16 and 22 are composed of a crystalline material. In this case, the matrix 22 of the phosphor layer 22 can be grown using the matrix 16 of the light scattering layer 19 as a seed crystal. That is, the matrices 16 and 22 can be continuously formed without forming an interface therebetween. The crystalline material is, for example, ZnO. ZnO as the material of the matrices 16 and 22 is specifically single-crystalline ZnO or c-axis oriented polycrystalline ZnO.

In the light scattering layer 19, the refractive index of the matrix 16 is different from that of the filler particles 18. With such a configuration, excitation light and light emitted from the phosphor particles 23 are scattered in various directions in the light scattering layer 19, and that suppresses travel, specifically, propagation of light only in a certain direction. In such a case, fluorescence is unlikely to occur in a portion to which excitation light is not applied, and thus a high contrast can be achieved. Suppressing travel of light inside the wavelength conversion member 90 makes it possible to produce light without sacrificing brightness and light emission efficiency and achieve a high contrast.

In the light scattering layer 19, a refractive index difference between the matrix 16 and filler particles 18 is, for example, 0.3 or more. With such a configuration, the scattering probability of light inside the wavelength conversion member 90 increases and a higher contrast can be achieved. The upper limit of the refractive index difference is, for example, but not particularly limited to, 1.3.

In the light scattering layer 19, the material of the matrix 16 and that of filler particles 18 are combined, for example, as follows. The matrix 16 is ZnO (n=1.95) and the filler particles 18 are $SiO_2$ (n=1.45). The matrix 16 is ZnO and the filler particles 18 are $TiO_2$ (n=2.72). The matrix 16 is ZnO and the filler particles 18 are $SiO_2$ and $TiO_2$. The matrix 16 is a silicone resin (n=1.40) and the filler particles 18 are $TiO_2$. The matrix 16 is a silicone resin and the filler particles 18 are BN (n=2.17). The matrix 16 is a silicone resin and the filler particles 18 are AlN (n=2.20).

The refractive index can be measured using the D line (589.3 nm) of sodium by the critical angle method. In the present disclosure, a measured refractive index value of a specimen produced using the same material as that of the matrix 16 can be used as the refractive index of the matrix 16. Similarly, a measured refractive index value of a specimen produced using the same material as that of the filler particles 18 can be used as the refractive index of the filler particles 18.

The average particle diameter of the filler particles 18 is, for example, in the range of 0.10 to 50.0 μm. The average particle diameter of the filler particles 18 can be measured by the same method as for the average particle diameter of the phosphor particles 23. The average particle diameter of the filler particles 18 is desirably smaller than that of the phosphor particles 23. Because such a configuration ensures a sufficient total surface area of the filler particles 18, the scattering probability of light inside the wavelength conversion member 90 increases and a higher contrast can be achieved.

In the light scattering layer 19, the thermal conductivity of the matrix 16 is, for example, higher than that of the filler particles 18. With such a configuration, heat of the phosphor layer 20 is promptly conducted to the substrate 11. Thus, an increase in temperature of the phosphor layer 20 is suppressed and excellent light emission efficiency can be achieved. The ratio ($\lambda 2/\lambda 1$) of the thermal conductivity $\lambda 2$ of the matrix 16 to the thermal conductivity $\lambda 1$ of the filler particles 18 is, for example, 2.0 or more. To obtain a sufficient effect of this, it is desirable that in the light scattering layer 19, the volume of the matrix 16 be greater than the total volume of the filler particles 18.

The thickness of the light scattering layer 19 is, for example, in the range of 1.0 to 100 μm. Appropriate adjustment of the thickness of the light scattering layer 19 can prevent light transmission from the phosphor layer 20 to the substrate 11 and suppress an increase in thermal resistance between the phosphor layer 20 and substrate 11.

The ratio (V1/V) of the volume V1 of the matrix 16 to the volume V of the light scattering layer 19 is, for example, in the range of 0.30 to 0.90. The ratio (V2/V) of the volume V2 of the filler particles 18 to the volume V of the light scattering layer 19 is, for example, in the range of 0.10 to 0.70.

The ratio (v1/v) of the volume v1 of the matrix 22 to the volume v of the phosphor layer 20 is, for example, in the range of 0.30 to 0.80. The ratio (v2/v) of the volume v2 of the phosphor particles 23 to the volume v of the phosphor layer 20 is, for example, in the range of 0.20 to 0.70.

In the light scattering layer 19, the filler particles 18 are desirably excellent in thermal conductance. From this perspective, $SiO_2$ particles as the filler particles 18 have room for improvement. $Al_2O_3$ particles whose surfaces are each covered with a $SiO_2$ coating, for example, satisfy both thermal conductance and refractive index requirements. As the refractive index of $Al_2O_3$ is 1.77, it is difficult to use $Al_2O_3$ particles in the wavelength conversion member of the present disclosure. The $Al_2O_3$ particles whose surfaces are each covered with the $SiO_2$ coating have an apparent refractive index (n=1.45) of $SiO_2$ and therefore can be preferably used in the wavelength conversion member of the present disclosure. The entire surface of each $Al_2O_3$ particle may be covered with the $SiO_2$ coating, or only a portion of the surface of each $Al_2O_3$ particle may be covered with the $SiO_2$ coating. Such filler particles 18 can be produced, for example, by a sol-gel process. Specifically, a sol mixture containing the $Al_2O_3$ particles and a precursor such as a silicon alkoxide is prepared. After filtration of the sol mixture, the residue is dried and heated to obtain the $Al_2O_3$ particles covered with the $SiO_2$ coating.

Next, the method for producing the wavelength conversion member 90 will be described.

When the matrix 16 of the light scattering layer 19 and the matrix 22 of the phosphor layer 20 are composed of a resin, the wavelength conversion member 90 can be produced by the following method. The filler particles 18 are mixed in a solution containing a resin and solvent to prepare a coating liquid. The coating liquid is applied to the substrate 11 so as to form a coating film on the substrate 11. The coating film is dried or cured to form the light scattering layer 19 on the substrate 11. Next, the phosphor particles 23 and filler particles 24 are mixed in a solution containing a resin and solvent to prepare a coating liquid. The coating liquid is applied to the substrate 11 having the light scattering layer 19 so as to form a coating film on the light scattering layer 19. The coating film is dried or cured to form the phosphor layer 20 on the light scattering layer 19. The wavelength conversion member 90 can thus be obtained.

When the matrix 16 of the light scattering layer 19 and the matrix 22 of the phosphor layer 20 are composed of ZnO, the wavelength conversion member 90 can be produced, for example, by a sol-gel process. First, a sol mixture containing the filler particles 18 and a precursor such as a zinc alkoxide is prepared. The sol mixture is applied to the substrate 11 so as to form a coating film on the substrate 11. The coating film is turned into a gel and heated to form the light scattering layer 19 on the substrate 11. Next, a sol mixture containing a precursor such as a zinc alkoxide, the phosphor particles 23, and filler particles 24 is prepared. The sol mixture is applied to the substrate 11 having the light scattering layer 19 so as to form a coating film on the light scattering layer 19. The coating film is turned into a gel and heated to form the phosphor layer 20 on the light scattering layer 19. The wavelength conversion member 90 can thus be obtained.

When the matrix 16 of the light scattering layer 19 and the matrix 22 of the phosphor layer 20 are single-crystalline ZnO or c-axis oriented polycrystalline ZnO, the wavelength conversion member 90 can be produced by the solution-growth method. First, the substrate 11 is prepared. A crystalline ZnO film is formed as the film 15 on the substrate body 13. A vacuum film formation method such as electron beam vapor deposition, reactive plasma deposition, sputtering, and pulsed laser deposition is used as the method for forming the ZnO film. The film 15 can be a single-crystalline ZnO film or polycrystalline ZnO film. Next, a layer including the filler particles 18 is formed on the substrate 11 (namely, on the film 15). For example, a dispersion containing the filler particles 18 is prepared. The substrate 11 is placed in the dispersion, and the filler particles 18 are deposited on the substrate 11 by means of an electrophoresis method. The layer including the filler particles 18 can thus be formed on the substrate 11. The layer including the filler particles 18 can also be formed on the substrate 11 by placing the substrate 11 in the dispersion and causing sedimentation of the filler particles 18. The layer including the filler particles 18 can also be formed on the substrate 11 using a coating liquid containing the filler particles 18 by a film formation method such as printing.

Next, the matrix 16 is formed between the particles by the solution-growth method using a Zn-containing solution. The light scattering layer 19 can thus be formed on the substrate 11. The solution-growth method used is chemical bath deposition carried out under atmospheric pressure, hydrothermal synthesis carried out under atmospheric pressure or a pressure higher than atmospheric pressure, electrochemical deposition in which voltage or current is applied, or the like. For example, an aqueous zinc nitrate solution containing hexamethylenetetramine is used as the solution for crystal growth. The crystalline matrix 16 is epitaxially grown on the film 15.

The phosphor layer 20 is formed on the light scattering layer 19 in the same manner as for the light scattering layer 19. The wavelength conversion member 90 can thus be obtained. Because the matrix 16 of the light scattering layer 19 functions as a seed crystal, no additional underlayer is necessary and the phosphor layer 20 can be formed efficiently.

When the material composition of the matrix 16 of the light scattering layer 19 is different from that of the matrix 22 of the phosphor layer 20, the light scattering layer 19 and phosphor layer 20 can be formed on the substrate 11 by combining the above methods.

According to the present embodiment, the light scattering effect in the light scattering layer 19 can be obtained in addition to the light scattering effect inside the phosphor layer 20.

Fifth Embodiment

Figure 9:
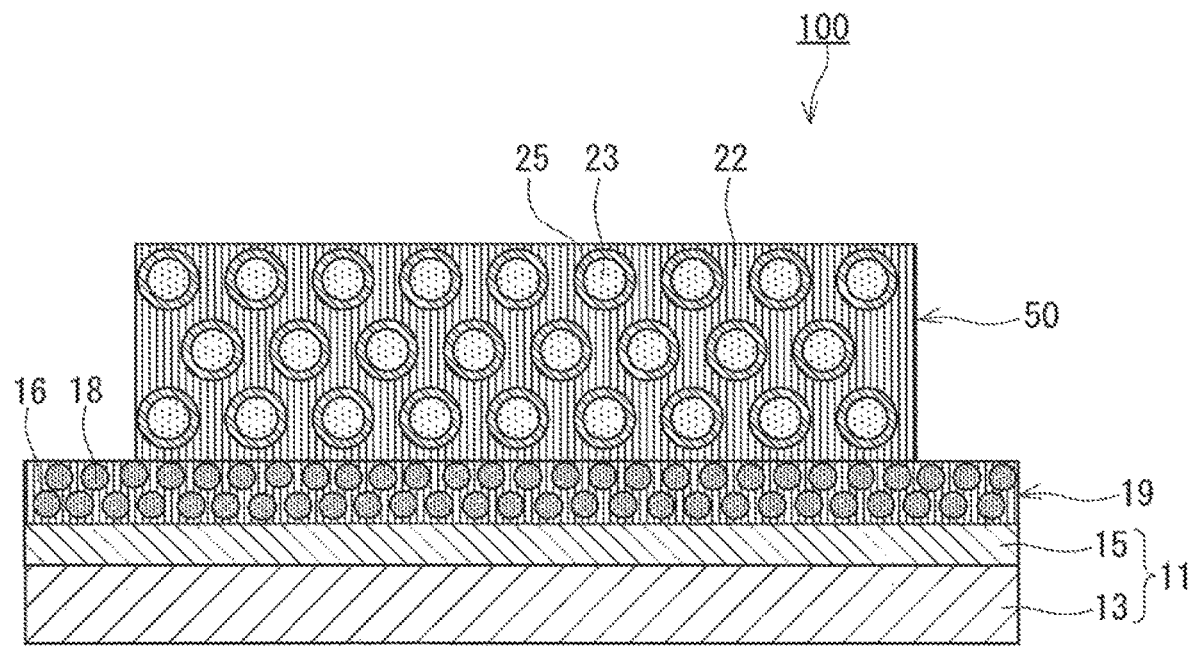
FIG. 9 is a schematic cross-sectional view of a wavelength conversion member according to a fifth embodiment of the present disclosure.

As shown in FIG. 9, a wavelength conversion member 100 according to the present embodiment includes the substrate 11, light scattering layer 19, and phosphor layer 50. The phosphor layer 50 has the matrix 22 and phosphor particles 23. The surfaces of the phosphor particles 23 are respectively covered by the surface coating layers 25.

A configuration of the phosphor layer 50 is as described in the second embodiment. The material composition of the surface coating layer 25 may be the same as or different from the material composition of the filler particles 18 described in the first embodiment.

Sixth Embodiment

Figure 10:
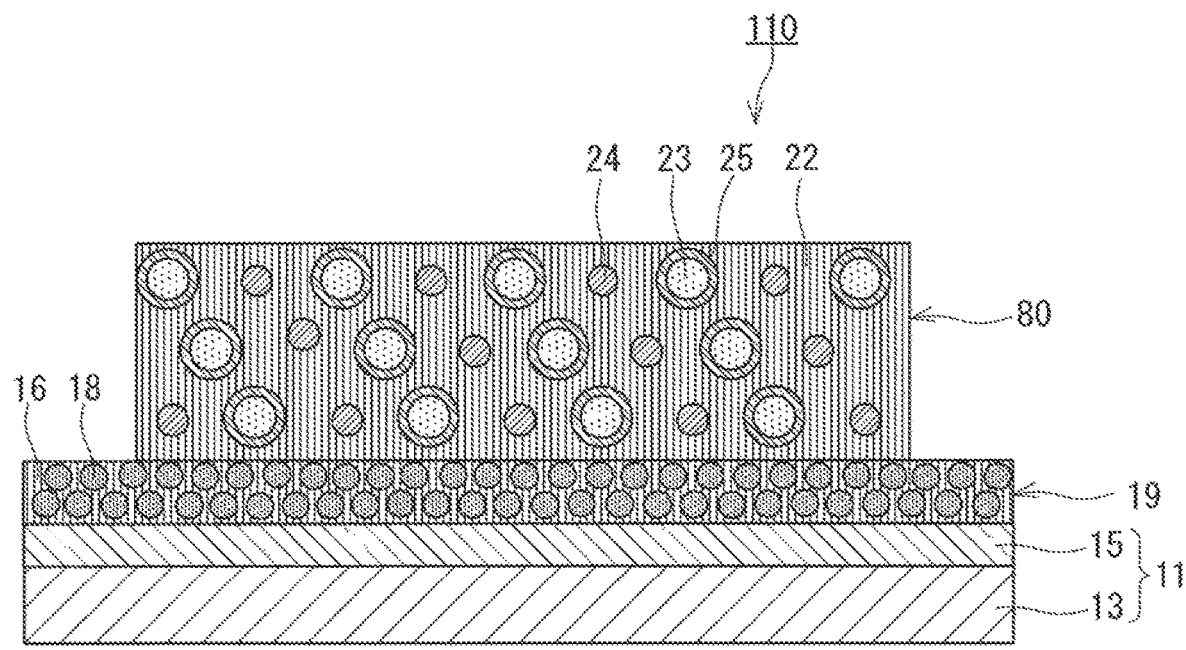
FIG. 10 is a schematic cross-sectional view of a wavelength conversion member according to a sixth embodiment of the present disclosure.

As shown in FIG. 10, a wavelength conversion member 110 according to the present embodiment includes the substrate 11, light scattering layer 19, and phosphor layer 80. The phosphor layer 80 has the matrix 22, phosphor particles 23, and filler particles 24. The surfaces of the phosphor particles 23 are respectively covered by the surface coating layers 25. The present embodiment is a combination of the fourth embodiment and fifth embodiment. According to the present embodiment, the advantageous effects of both the fourth and fifth embodiments can be obtained. The substrate 11 may be replaced with the substrate 12 described with reference to FIG. 2.

(Reference Example)

Figure 11:
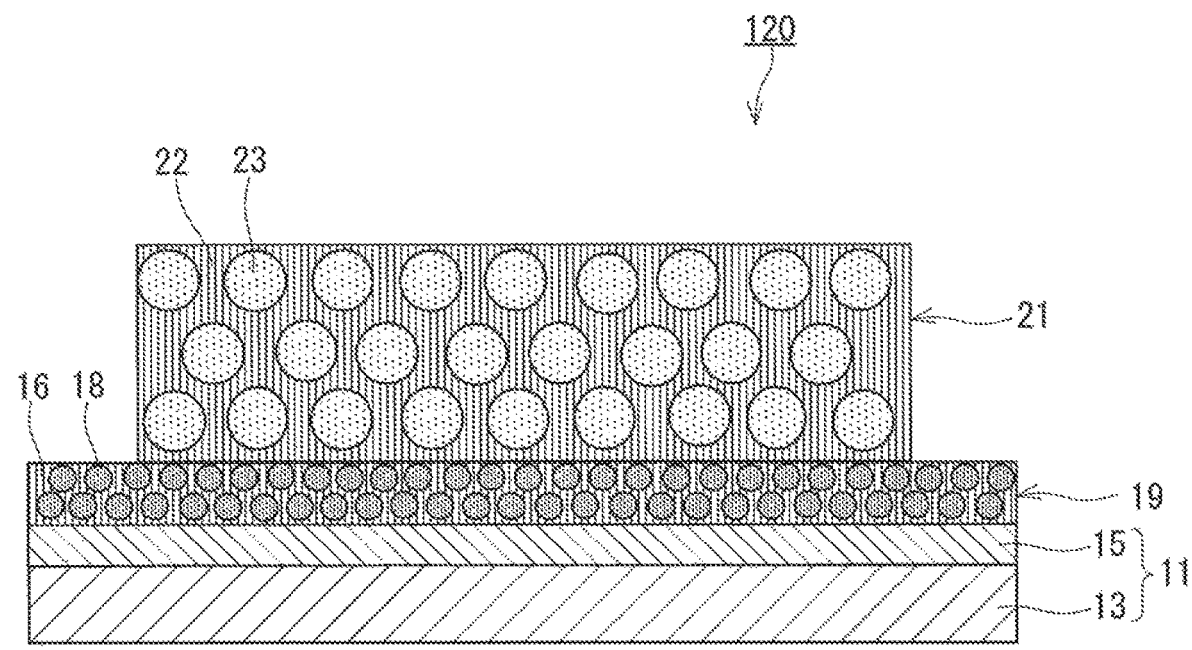
FIG. 11 is a schematic cross-sectional view of a wavelength conversion member according to a reference example.

As shown in FIG. 11, a wavelength conversion member 120 according to a reference example includes the substrate 11, light scattering layer 19, and a phosphor layer 21. The phosphor layer 21 has the matrix 22 and phosphor particles 23. A configuration of the wavelength conversion member 120 is the same as that of the wavelength conversion member 90 (FIG. 8), except that the filler particles 24 are not included in the phosphor layer 21.

Excitation light and light emitted from the phosphor particles 23 are scattered in the light scattering layer 19, and thus light is unlikely to travel inside the wavelength conversion member 120. In such a case, fluorescence is unlikely to occur in a portion to which excitation light is not applied, and thus a high contrast can be achieved. Suppressing travel of light inside the wavelength conversion member 120 makes it possible to produce light without sacrificing brightness and light emission efficiency and achieve a high contrast.

(Embodiment of Light Source)

Figure 12:
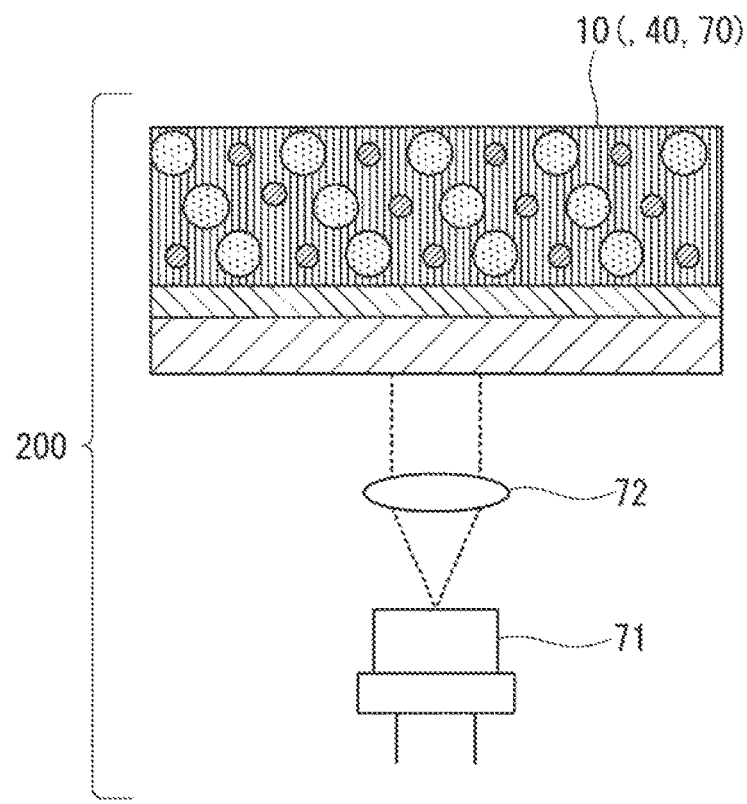
FIG. 12 is a schematic cross-sectional view of a transmission light source employing a wavelength conversion member of the present disclosure.

As shown in FIG. 12, a light source 200 of the present embodiment includes the wavelength conversion member 10 and a light-emitting device 71. The light-emitting device 71 faces the substrate 11 of the wavelength conversion member 10. Light from the light-emitting device 71 passes through the substrate 11 and reaches the phosphor layer 20. That is, the light source 200 is a transmission light source. The wavelength conversion members 40 and 70 can be used instead of the wavelength conversion member 10. A combination of two or more selected from the wavelength conversion members 10, 40, and 70 can be used in the light source 200.

The light-emitting device 71 emits excitation light. The light-emitting device 71 is typically a semiconductor light-emitting device. The semiconductor light-emitting device is, for example, an LED, superluminescent diode (SLD), or laser diode (LD). With the use of an LD as the light-emitting device 71, the wavelength conversion member 10 of the present disclosure exhibits a particularly high effect. LD light has excellent directivity and can be applied only to a certain portion of the wavelength conversion member 10. That is, an LD is suitable to achieve a high contrast. The light source 200 having excellent contrast performance can be obtained by combining an LD and the wavelength conversion member 10 of the present disclosure.

The light-emitting device 71 may be composed of a single LD, or may be composed of a plurality of LDs optically coupled to each other. The light-emitting device 71 emits, for example, blue light. In the present disclosure, blue light refers to light having a peak wavelength in the range of 420 to 470 nm.

The light source 200 further includes an optical system 72. The optical system 72 may be located on an optical path of excitation light emitted from the light-emitting device 71. The optical system 72 includes an optical component such as a lens, mirror, and optical fiber.

Figure 13:
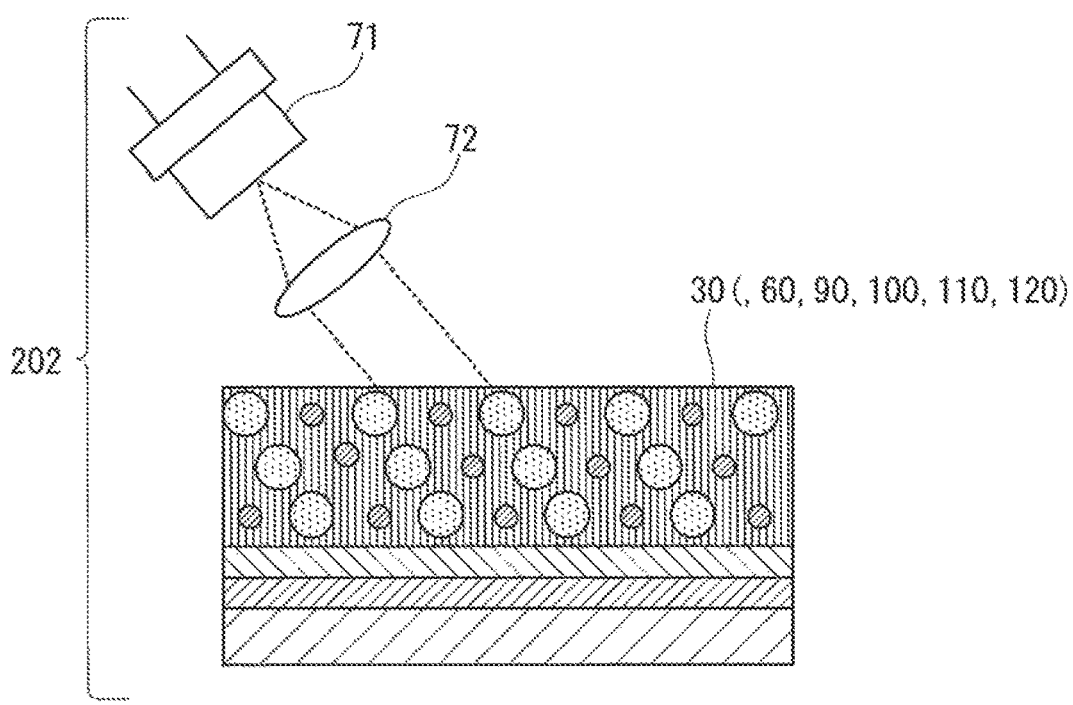
FIG. 13 is a schematic cross-sectional view of a reflection light source of a wavelength conversion member of the present disclosure.

As shown in FIG. 13, a light source 202 of the present embodiment includes the wavelength conversion member 30 and light-emitting device 71. The phosphor layer 20 of the wavelength conversion member 30 is located between the light-emitting device 71 and the substrate 11 of the wavelength conversion member 30. That is, the light source 202 is a reflection light source. The wavelength conversion members 60, 90, 100, 110, and 120 can be used instead of the wavelength conversion member 30. A combination of two or more selected from the wavelength conversion members 60, 90, 100, 110, and 120 can be used in the light source 202.

(Embodiment of Lighting Device)

Figure 14:
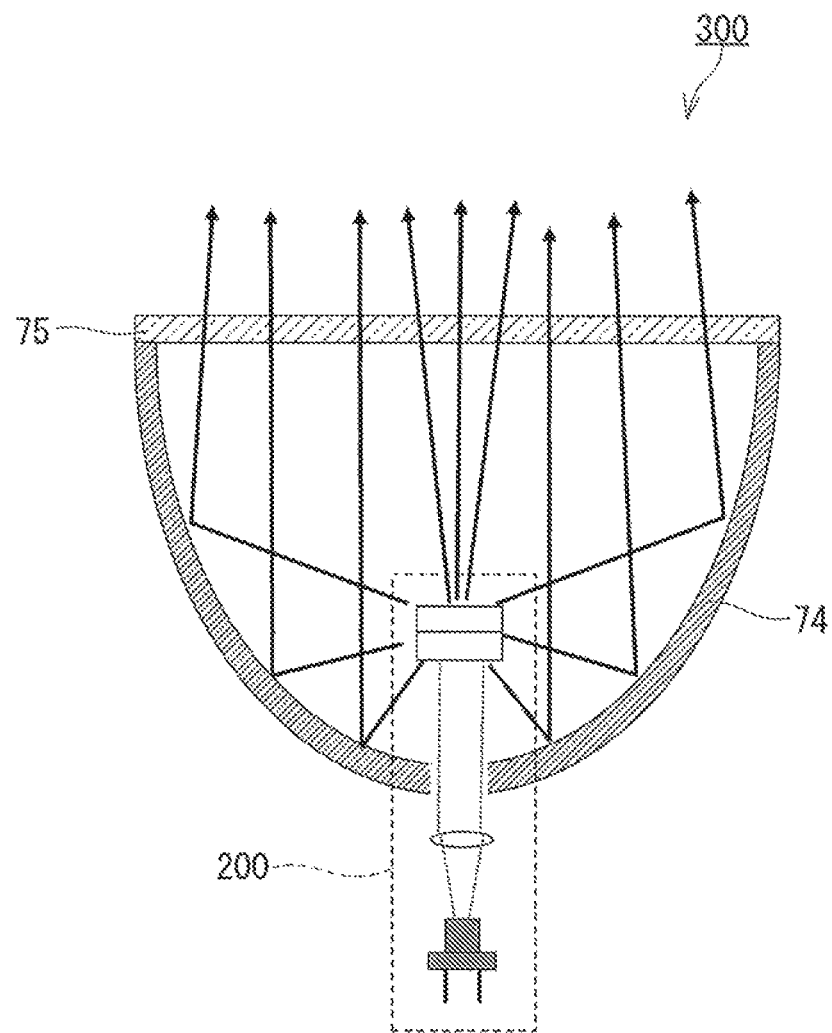
FIG. 14 is a schematic configuration diagram of a lighting device employing the transmission light source of the present disclosure.

As shown in FIG. 14, a lighting device 300 of the present embodiment includes the light source 200 and an optical component 74. The optical component 74 is a component for leading light emitted from the light source 200 forward, and is specifically a reflector. The optical component 74 has, for example, a film made of a metal such as Al and Ag or an Al film having a surface on which a protective film is formed. Ahead of the light source 200, there may be provided a filter 75. The filter 75 absorbs or scatters blue light so that coherent blue light from the light-emitting device of the light source 200 will not go outside directly. The lighting device 300 may be of a so-called reflector type or may be of a projector type. The lighting device 300 is, for example, a vehicle headlamp.

Figure 15:
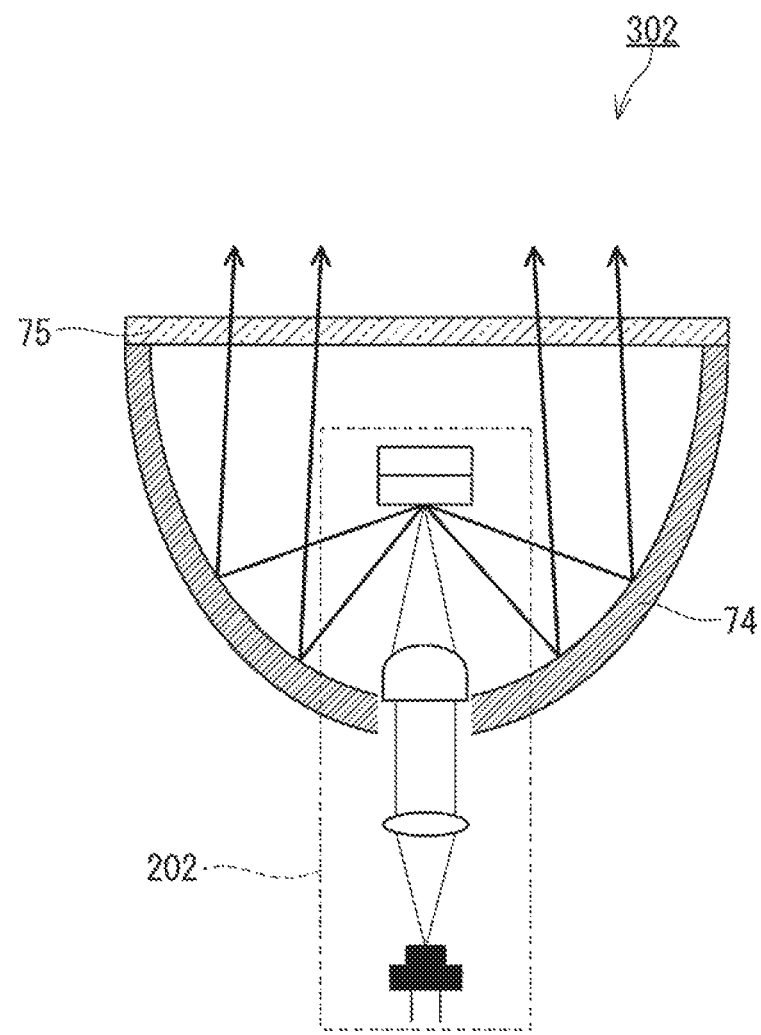
FIG. 15 is a schematic configuration diagram of a lighting device employing the reflection light source of the present disclosure.

As shown in FIG. 15, a lighting device 302 can be configured using the light source 202 which is a reflection light source.

INDUSTRIAL APPLICABILITY

Light sources including the wavelength conversion member of the present disclosure can be used in general lighting devices such as ceiling lights; special lighting devices such as spotlights, stadium lights, and studio lights; vehicle lighting devices such as headlamps; image devices such as projectors, head-up displays, digital cameras, and TV sets; medical devices such as endoscopes; information devices such as personal computers, tablet PCs, smartphones, and mobile phones.

The invention claimed is:

1. A wavelength conversion member, comprising:
a first matrix composed of inorganic material;
phosphor particles embedded in the first matrix;
first filler particles embedded in the first matrix; and
surface coating layers respectively covering surfaces of the phosphor particles, wherein
an average particle diameter of the first filler particles is equal to or greater than a peak wavelength of light fluorescently emitted from the phosphor particles, and
the wavelength conversion member satisfies relationships of $|n3-n1|>|n1-n2|$ and $|n4-n1|>|n1-n2|$ wherein $n1$ is a refractive index of the first matrix, $n2$ is a refractive index of the phosphor particles, $n3$ is a refractive index of the first filler particles, and $n4$ is a refractive index of the surface coating layers.

2. The wavelength conversion member according to claim 1, satisfying $|n3-n1|-|n1-n2|\geq 0.3$.

3. The wavelength conversion member according to claim 1, wherein an average particle diameter of the first filler particles is smaller than an average particle diameter of the phosphor particles.

4. The wavelength conversion member according to claim 1, wherein the first filler particles comprise a metal oxide.

5. The wavelength conversion member according to claim 1, satisfying $|n4-n1|-|n1-n2|\geq 0.3$.

6. The wavelength conversion member according to claim 1, wherein an average thickness of the surface coating layers is smaller than an average particle diameter of the phosphor particles.

7. The wavelength conversion member according to claim 1, wherein an average thickness of the surface coating layers is equal to or greater than a peak wavelength of light fluorescently emitted from the phosphor particles.

8. The wavelength conversion member according to claim 1, wherein the first matrix is composed of single-crystalline ZnO or c-axis oriented polycrystalline ZnO.

9. The wavelength conversion member according to claim 1, further comprising:
a substrate;
a phosphor layer supported by the substrate; and
a light scattering layer disposed between the substrate and the phosphor layer, wherein
the phosphor layer comprises the first matrix, the phosphor particles, and at least one selected from the group consisting of the first filler particles and the surface coating layers,
the light scattering layer comprises a second matrix and second filler particles embedded in the second matrix, and
a refractive index of the second matrix is different from a refractive index of the second filler particles.

10. The wavelength conversion member according to claim 9, wherein a refractive index difference between the second matrix and the second filler particles is 0.3 or more.

11. The wavelength conversion member according to claim 9, wherein thermal conductivity of the second matrix is higher than thermal conductivity of the second filler particles.

12. The wavelength conversion member according to claim 9, wherein material composition of the second matrix of the light scattering layer is the same as material composition of the first matrix of the phosphor layer.

13. The wavelength conversion member according to claim 9, wherein the second filler particles comprise at least one selected from the group consisting of $SiO_2$ particles and $TiO_2$ particles.

14. The wavelength conversion member according to claim 9, wherein the second matrix is composed of single-crystalline ZnO or c-axis oriented polycrystalline ZnO.

15. A light source, comprising:
a light-emitting device; and
the wavelength conversion member according to claim 1 that emits fluorescence in response to excitation light applied from the light-emitting device.

16. A light source, comprising:
a light-emitting device; and
the wavelength conversion member according to claim 9 that emits fluorescence in response to excitation light applied from the light-emitting device, wherein
the phosphor layer of the wavelength conversion member and the light scattering layer of the wavelength conversion member are located between the light-emitting device and the substrate of the wavelength conversion member.

17. The light source according to claim 15, wherein the light-emitting device is a laser diode.

18. A lighting device, comprising:
the light source according to claim 15; and
an optical component that leads light emitted from the light source to the outside.

* * * * *